Feb. 17, 1970   W. H. VERHOEF   3,495,451
APPARATUS FOR GENERATING FUNCTIONAL WAVEFORMS
OF A ROTATING MACHINE
Filed May 15, 1968   3 Sheets-Sheet 1

WILLEM H. VERHOEF
INVENTOR
BY
BUCKHORN, BLORE, KLARQUIST & SPARKMAN
ATTORNEYS

WILLEM H. VERHOEF
INVENTOR

BY
BUCKHORN, BLORE, KLARQUIST & SPARKMAN
ATTORNEYS

United States Patent Office 3,495,451
Patented Feb. 17, 1970

3,495,451
APPARATUS FOR GENERATING FUNCTIONAL WAVEFORMS OF A ROTATING MACHINE
Willem H. Verhoef, Portland, Oreg., assignor to Tektronix, Inc. Beaverton, Oreg., a corporation of Oregon
Filed May 15, 1968, Ser. No. 729,296
Int. Cl. G01n *19/08*
U.S. Cl. 73—117.3         17 Claims

ABSTRACT OF THE DISCLOSURE

A function generator device is provided with a rotatable function disc having annular light transmissive recording thereon through which light is directed from a light source to photosensitive means. The annular recordings are descriptive of simulated piston and shaft functions in a rotating machine to which the function generator is attached. The output signals derived from the photosensitive means as well as signals derived from additional transducers attached to the machine are applied to a cathode ray oscilloscope for portraying various machine characteristics. The function generator is adjustably rotatable within its frame relative to the rotating function disc for synchronizing or indexing the function generator outputs.

Background of the invention

While various transducers may be employed in the testing and analyzing of operation of an internal combustion engine or the like, the output data secured is frequently not directly descriptive of machine operation, but must be interpreted and plotted before various functions of a particular machine are readily appreciated. Usually such transducer information is plotted or portrayed relative to timing signals derived directly from the rotating machine so that a particular point in the machine's cycle of operation when a particular pressure existed, or a particular vibration took place, can be ascertained. Timing markers obtained from the rotating machine are not really indicative of a machine function.

Summary of the invention

According to the present invention, light is modulated in proportion to a particular simulated function of a rotating machine, e.g. crank angle or piston displacement, and this simulated information is provided to an output device such as a cathode ray oscilloscope. In a rotational function generator device embodiment, a function disc, driven by the machine shaft, includes a generally annular recording of contrasting light transmissivity interposed between a light source and a photosensitive means. The device supplies an electrical signal from the photosensitive means descriptive of a simulated piston function, and such electrical signal is applied to the aforementioned output device. The output device advantageously receives other information from transducers such as may measure pressure, vibration, ignition, or the like, for plotting complete engine diagrams. In accordance with an important advantage of the present invention, the simulated piston functions generated are easily synchronized or indexed with machine operation by adjustable rotation of the housing of the generator device relative to its support base and its input shaft.

It is accordingly an object of the present invention to provide an improved method and apparatus for generating functional waveforms of a rotating machine.

It is a further object of the present invention to provide an improved method and apparatus for generating functional waveforms of a rotating machine in synchonized relation to the operation of such machine.

It is a further object of the present invention to provide an improved method and apparatus for providing simulated crank angle and piston displacement functions for a rotating, piston operated machine.

It is another object of the present invention to provide an improved rotational function generator device for attachment to a rotating machine shaft, which may be readily adjusted with respect to the phase of output produced even while the machine and device are turning at high speed.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

Drawings

Figure 5:
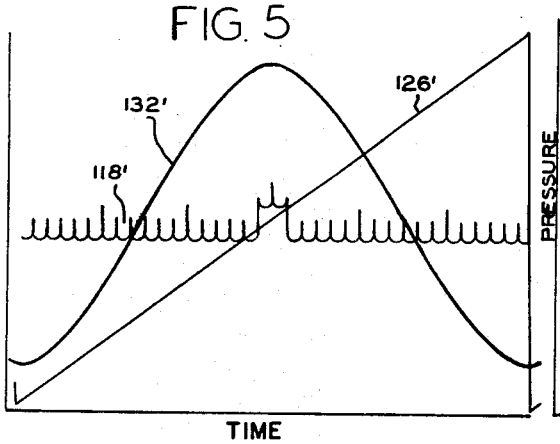
Figure 6:
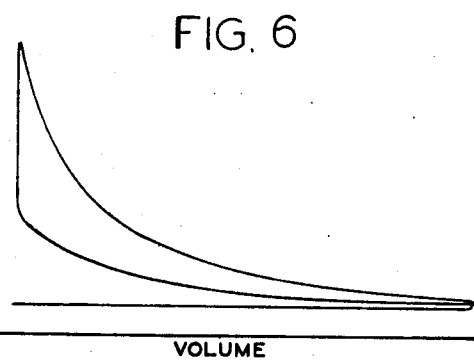
Figure 7:
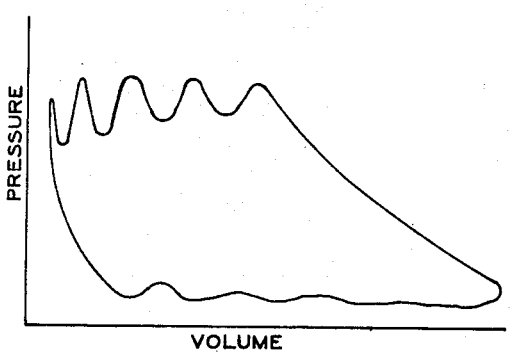
Figure 8:
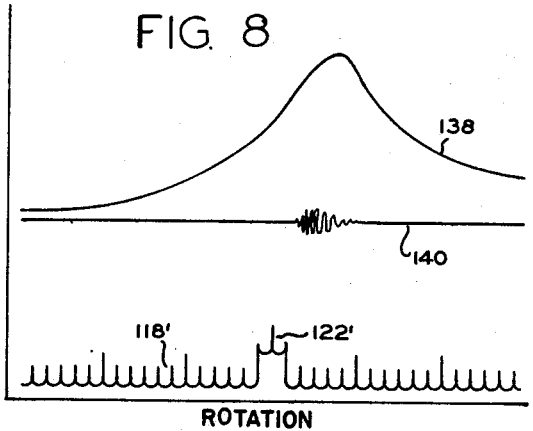
Figure 9:
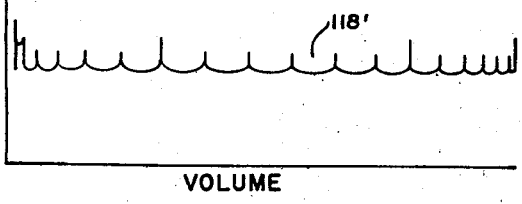

FIG. 5 plots a series of outputs procured from the aforementioned function generator device;

FIG. 6 is a pressure-volume diagram for a four cycle internal combustion engine visually portrayed according to the method and apparatus of the present invention;

FIG. 7 is a pressure-volume diagram for a compressor, secured according to the method and apparatus of the present invention;

FIG. 8 is a plot of pressure, vibration, and timing markers, secured according to the method and apparatus of the present invention; and FIG. 9 illustrates an additional output visually provided according to the method and apparatus of the present invention.

Detailed description

Figure 1:
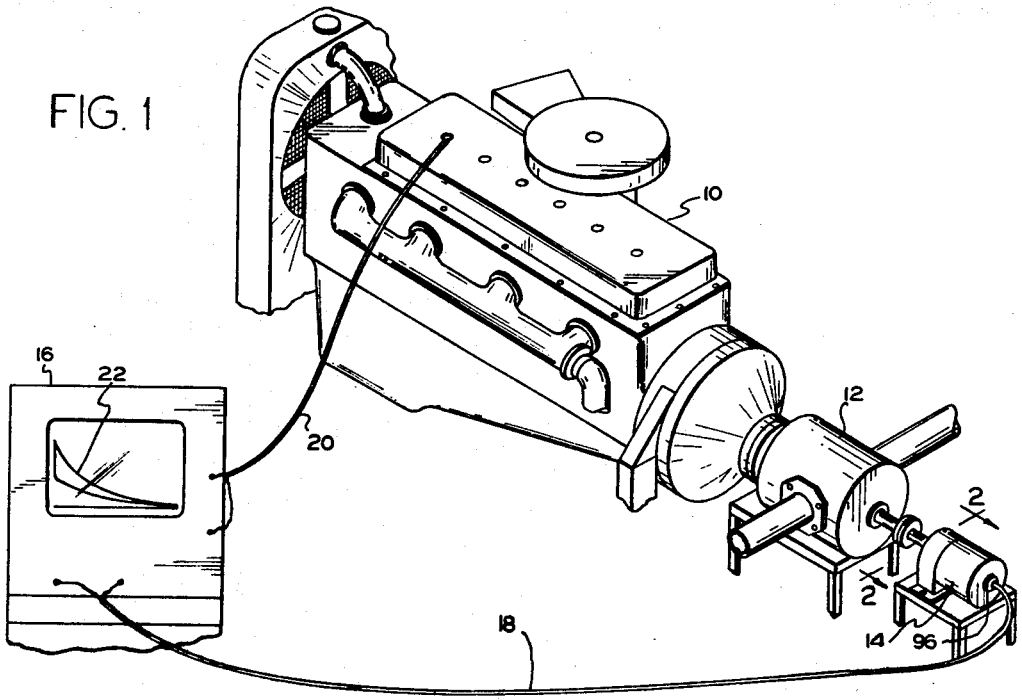
FIG. 1 is a view of a system according to the present invention for portraying a pressure-volume diagram for an internal combustion engine.

Referring to the drawings, and particularly to FIG. 1, a system is illustrated for visually portraying a waveform indicative of the operation of an internal combustion engine or the like. Briefly, an internal combustion engine 10 has its output directly coupled to drive a load, here comprising a hydraulic gear pump 12. The engine is also coupled to directly drive a rotational function generator device 14. As hereinafter more fully described, rotational function generator device 14 provides an output proportional to piston displacement of a predetermined piston in engine 10, this output being connected to the horizontal input of cathode ray oscilloscope 16 via shielded cable 18. A second cable 20 is connected to a pressure transducer (not shown) inside the engine adapted to register pressure in the cylinder above the same piston. Cable 20 is connected to the vetrical input of oscilloscope 16, resulting in a pressure-volume diagram 22 for the predetermined cylinder, continuously portrayed on the screen of the oscilloscope's cathode ray tube.

As understood by those skilled in the art, the horizontal input via cable 18 causes deflection of the cathode ray tube's electron beam in a horizontal direction to produce a horizontal trace, while the vetrical input via cable 20 produces a vertical deflection, whereby the overall pressure versus volume presentation is procured. This presentation is continuously and instantaneously available for as long as desired, rather than being the result of extensive calculation and interpretation from engineering data. As understood by those skilled in the art, the area inside curve 22 is proportional to the indicated horsepower contributed by the particular cylinder under test. Other cylinders may be similarly checked by connecting cable 20 to other pressure transducers communicating with other cylinders in engine 10, while the output of rotational function generator device 14 is easily adjusted to match the phase of operation of each engine piston in a manner hereinafter more fully described. The apparatus of FIG. 1 as thus far described is only preliminarily illustrative of the manner of employing the present invention.

After consideration of the remainder of this specification, it will be appreciated that many other engine function diagrams and waveforms may be similarly portrayed. Moreover, engine 10 is illustrative of only one type of rotating, piston operated machine with which apparatus according to the present invention is found useful.

Figure 2:
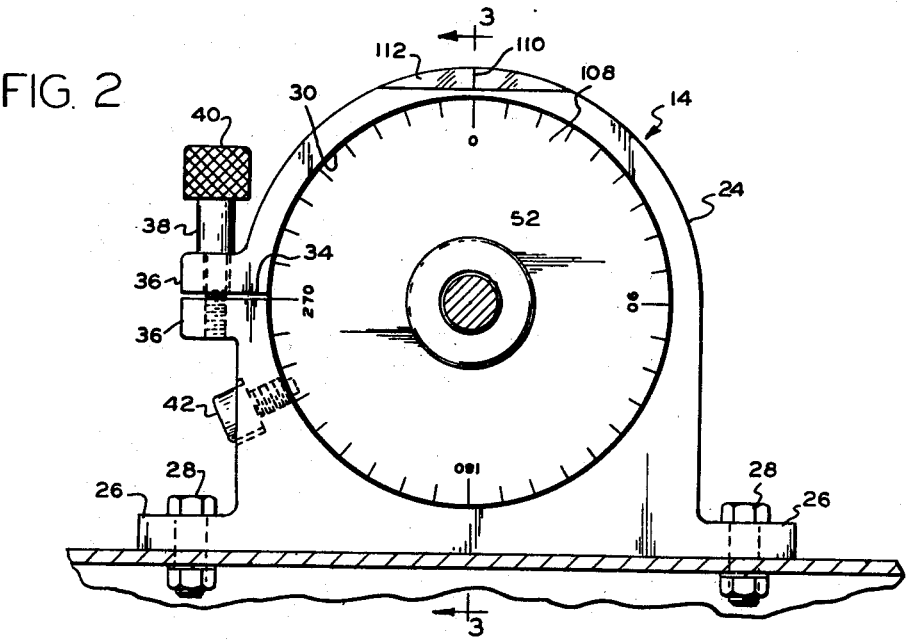
FIG. 2 is a front view of a rotational function generator device according to the present invention.
Figure 3:
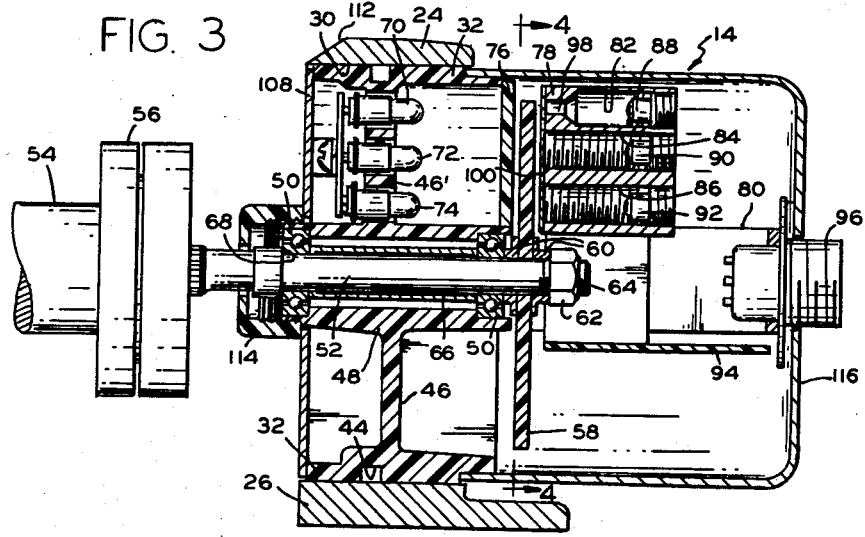
FIG. 3 is a longitudinal cross section view of the FIG. 2 device.
Figure 4:
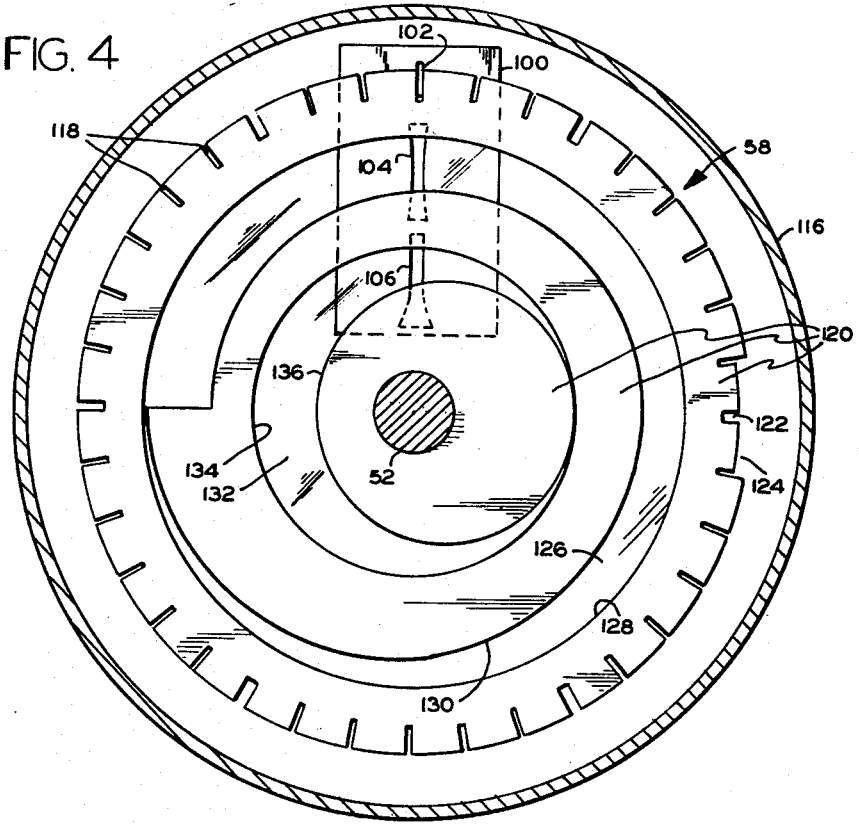
FIG. 4 is a lateral cross section of the rotational function generator device according to the present invention take at 4—4 in FIG. 3.

Referring to FIGS. 3 and 4, a rotational function generator device 14 comprises a frame 24, advantageously formed of aluminum, having a lower base portion 26 for securing the frame to a horizontal surface as by means of bolts 28. The frame 24 has a ring-shaped or cylindrical opening 30 within which cylindrical housing 32, suitably formed of delrin plastic, is slidably received. The frame 25 is split at 34 and provided with horizontally extending ears 36, the lower of which is threaded to receive the thread of thumb screw 38. Thumb screw 38 is shouldered above the upper ear 36 and provided with a knurled knob, 40, and is used to selectively secure housing 32 against rotation. A key screw 42, received in a matchingly threaded hold in housing 24, extends radially inward from the lower left side of frame 24 as viewed in FIG. 2, and into a circumferential slot 44 provided in housing 32. Key screw 42 extends into slot 44 only far enough to prevent housing 32 from sliding longitudinally within frame 24.

Cylindrical housing 32 includes web members 46 extending inwardly and supporting a central hub 48 which receives the outer rings of high speed deep-grooved ball bearings 50 at either end of hub 48. Journaled in these bearings is the main shaft 52 of the function generator device, which is suitably secured to shaft 54 of a rotating machine by means of coupling 56 to one end of hub 48, and which supports function disc 58 at the other end of hub 48.

Function disc 58, which will be hereinafter more fully described, has variable light transmissivity in the form of a plurality of generally annular recordings including light areas and dark areas. Function disc 58 suitably comprises a circular disc of clear plastic or glass, one side of which is coated with a photographic emulsion exposed and developed to form the requisite light and dark areas. Such emulsion is desirably located on the side of function disc 58 towards hub 48. Function disc 58 is centrally apertured to receive shaft 52 and is positioned on shaft 52 between collars 60. A locking nut 62 is secured on threaded right hand end 64 of shaft 52 (as viewed in FIG. 3), and this locking nut clamps disc 58, collars 60, the inner rings of bearings 50, and a bearing spacer 66, longitudinally together against a shoulder 68 on the engine end of the input shaft.

A web 46' of housing 32 is here provided with three apertures to receive light sources comprising lamps 70, 72, and 74. The apertures and lamps are suitably aligned radially of shaft 52. The lamps may comprise small electrically operable filament lamps facing rearwardly of the apparatus, i.e. to the right in FIG. 3, and supplied with a source of power (not shown) for substantially continuous illumination thereof. At the rear of housing 32 in the path of light from lamps 70, 72, and 74, a translucent diffusing plate 76 is attached which is suitably formed of plexiglass and which diffuses the light reaching function disc 58 from the lamps.

A block 78, suitably formed of aluminum, is supported by bracket 80 which extends around function disc 58, being secured to housing 32. Block 78 includes apertures 82, 84, and 86, respectively longitudinally aligned with lamps 70, 72, and 74 to receive light therefrom through diffusing plate 76 and function disc 58. At the remote end of apertures 82, 84, and 86 from function disc 58 are located photosensitive means here comprising phototransistors 88, 90, and 92, respectively, which receive the light from the aforementioned lamps, as modulated by the function disc, and which provide electrical signals in response to the light received. The electrical signals are amplified with amplifier means located on an etched wiring board 94 also supported on bracket 80. The amplified signals are then supplied to connector 96 to which cable 18 in FIG. 1 is attached.

Aperture 82 in block 78 is necked down at 98 near the edge of function disc 58 so as to be in juxtaposition with spaced angle markers 118 around the edge of func-disc 58 as hereinafter more fully described. Apertures 84 and 86 are threaded to reduce light reflection therealong. At the forward end of apertures 82, 84, and 86, i.e. at the surface of block 78, is secured a mask 100 having apertures 102, 104, and 106, respectively positioned in line with apertures 82, 84, and 86 (see FIG. 4) for causing phototransistors 88, 90, and 92 to be responsive to narrow areas of light as transmitted through disc 58. Apertures 82, 84, and 86 are elongated and aligned substantially radially of shaft 52.

At the forward end of rotational functional generator device 14 is located a scale plate 108 provided with angular indicia best seen in FIG. 2, these indicia being positionable relative to marker 110 on beveled top surface 112 of frame 24. Plastic nut 114 is threadably received at the forward end of hub 48 and is employed to hold the outer periphery of scale plate 108 against the cylindrical periphery of housing 32. A metal outer shield cover 116 is received around the rear outer edge of housing 32 and encloses block 78, disc 58, circuit board 94 and a portion of connector 96.

Turning to FIG. 4, function disc 58, which is suitably formed of transparent glass or plastic, is provided with generally annular recordings of contrasting light transmissivity. The glass or plastic plate is suitably coated with a photographic emulsion which is exposed and developed to provide a dark nontransparent background 120 interrupted by the annular recordings in the form of light transparent areas or regions. The first annular recording is suitably located around the peripheral edge of function disc 58 and comprises the angle markers 118 comprising transparent areas spaced ten degrees apart and which extend inwardly from the edge of the disc. A zero degree or reference marker 122 corresponds to the top-dead-center position of a piston in an internal combustion engine or the like under test, and is distinguished by a transparent edge strip 124 extending to the next angle markers on either side thereof. Every sixth marker, representing sixty degree intervals around disc 58 and including marker 122, are somewhat wider than the remaining markers. The markers 118 consecutively align with aperture 102 in mask 100 as disc 58 rotates.

Proceeding inwardly from the edge of disc 58, the next annular recording is provided by a transparent area 126. The outer edge of transparent area 126 is defined by a circle 128 concentric with shaft 52, while the inner boundary 130 of area 126 spirals inwardly from a point on circle 128 diametrically opposite marker 122. The boundary 130 spirals inwardly at a constant rate so the width of area 126 increases linearly with angular position until a point opposite marker 122 is again reached. The recording comprising area 126 describes the crank angle of a rotating machine to which the rotational function generator device 14 is connected. This recording is substantially aligned with aperture 104 in mask 100 for determining the amount of light passing therethrough.

The innermost annular recording on disc 58 comprises transparent area 132, the outer boundary of which comprises circle 134 concentric with shaft 52. The inner boundary of area 132 is formed by eccentric circle 136 tangent to circle 134 at the peripheral location on circle 134 closest to marker 122. The eccentricity of the two circles is desirably determined by the mechanical constants of the piston linkage for the rotating machine under test. Thus, the radius of circle 136 is proportional to connecting rod length in the machine under test, while the distance between the centers of circles 134 and 136, or the eccentricity involved, is proportional to the crank radius in the machine under test. Thus, if $r_1$ equals the radius of circle 136 and $e$ equals the distance between the centers of circles 134 and 136, then $e/r_1 = R/L$, where R equals the engine crank radius, and L equals connecting rod length. The recording comprising area 132 is positioned for varying the light passing through aperture 106, and this light is proportional to piston displacement or volume in an engine cylinder. As will be appreciated, the width of recording 132 is minimum at a location adjacent marker 122 corresponding to top dead center for the piston. At the same time, the recording comprising area 126 for portraying rotational angle is made to start and finish 180 degrees away from the top dead center marker for ease in visually representing piston action near top dead center as will hereinafter more fully appear.

Apertures 104 and 106 allow narrow strips of light provided through recordings 126 and 132 respectively to be sensed by corresponding phototransistors. Aperture 104 is generally hour-glass shaped in order to compensate for nonlinearity in light falling on the annular recording 126 of the function disc whereby the light reaching phototransistor 90 more nearly corresponds to the rotation angle of the disc. Light passing directly from lamp 72 through diffusing plate 76 and aperture 104 will affect phototransistor 90 to a greater extent than light reaching phototransistor 90 angularly or indirectly. Therefore, aperture 104 is made wider toward its upper and lower extremities. For similar reasons of linearity, the width of aperture 106 increases toward its lower extremity closest to shaft 52.

In use, the rotational function generator device according to the present invention provides an output for connection to cathode ray oscilloscope or similar visual output device. The electrical signals produced by phototransistors 88, 90, and 92 corresponding to the light passing through respective annular recordings in disc 58 from a source of light are suitably applied to the oscilloscope to cause horizontal or vertical deflection of the oscilloscope's electron beam. For example, a selector switch in a plug-unit in the oscilloscope suitably allows display of the piston displacement (from phototransistor 92) or crank angle (from phototransistor 90) on the horizontal axis of the oscilloscope. Time may also be employed as a basis of the horizontal sweep of the oscilloscope. The output of phototransistor 88, corresponding to the degree markers, may be portrayed on the vertical axis. Obviously, the outputs provided from function generator device 14 may be interchanged to operate either the vertical or horizontal deflection plates of the oscilloscope. Various mechanical transducers, also connected to the engine, may measure pressure, vibration, ignition, and other factors, and may provide outputs for causing either horizontal or vertical deflection in the oscilloscope, in simultaneous timed relation with one or more of the outputs procured from rotational function generator 14.

FIG. 5 is a view of a multitrace oscilloscope presentation wherein the three outputs of function generator device 14 are portayed against time: trace 118' corresponding to angle markers 118, saw tooth trace 126' corresponding to rotational angle recording 126, and cyclic trace 132' corresponding to piston displacement recording 132. In this instance, the phase of trace 132' is reversed 180 degrees, which is conveniently accomplished electrically. Trace 132' is approximately a sine wave, but contains considerable harmonic content dependent upon the particular engine crank radius to which the trace corresponds. These three functions are most significantly applied to the oscilloscope in conjunction with the output of a mechanical transducer for producing a correlated pattern or diagram for comparison. One such diagram is illustrated in FIG. 6 wherein pressure is plotted versus volume for a four-cycle engine. In this particular instance, the horizontal deflection circuitry of the oscilloscope is connected to receive the output of phototransistor 92, the output proportional to piston displacement, while the vertical deflection circuitry of the oscilloscope receives pressure information from a pressure transducer. This connection has been illustrated in FIG. 1, and described in connection therewith. FIG. 7 is a similar presentation of pressure versus volume for a piston type compressor wherein the oscilloscope is connected to the rotating machine in substantially the same manner as described in connection with FIG. 1.

In FIG. 8, cylinder pressure 138 in an internal combustion engine as measured by a pressure transducer is applied to vertical deflection apparatus on a multi-trace oscilloscope, and similarly a vibration transducer attached to the engine is connected to the oscilloscope to produce a trace 140. Also, trace 118', corresponding to angle markers from device 14, produces vertical deflection in the oscilloscope. The horizontal deflection apparatus of the oscilloscope is connected to receive the output of phototransistor 90 corresponding to engine rotation angle. It will be seen that use of the output of phototransistor 90 for this purpose places top dead center marker 122' constantly in the middle of the oscilloscope presentation. The crank angle signal is thus advantageously applied as a time base for portrayal of other data. Maximum pressure takes place within the particular cylinder under test in FIG. 8 at approximately 45 degrees after top dead center. An ignition trace (not shown) may be similarly included in such a portrayal.

FIG. 9 illustrates angle markers 118' displayed by means of vertical deflection on an oscilloscope, while piston displacement or volume, derived from phototransistor 92, is applied as the horizontal deflection signal. This type of trace is advantageously employed on a multi-trace oscilloscope in conjunction with a P-V diagram of a type illustrated in FIG. 6 or FIG. 7 to determine the angular position at which particular pressure-volume conditions take place.

Of particular advantage in the construction of the rotational function generator device according to the present invention is its ability for rotational adjustment relative to the motor shaft. This rotational adjustment may be made while the motor shaft, directly connected to shaft 52 of the function generator device, rapidly rotates function disc 58. Thumb screw 38 is loosened, and the housing 32 or the cover 116 is grasped and turned until a particular phase of output is procured as viewed on the oscilloscope corresponding to the operation of a particular piston in the machine under test. For example, the angle marker output from the function generator device may be applied in an oscilloscope at the same time as a top-dead-center signal is applied to the oscilloscope from a magnetic pick-up adjacent a marked flywheel on the engine under test. The housing of the function generator device is turned until top-dead-center markers are aligned, e.g. employing a pair of oscilloscope traces. Then, thumb screw 38 is retightened. The function generator device will then continue to provide properly phased information corresponding to a particular piston in the rotating machine, and does not ordinarily require further adjustment. The function generator device thus rotates within a frame coaxially around a shaft itself rotating at high speed. Typical speeds are up to 20,000 r.p.m.

Nut 114 may be loosened, and scale plate 108 may be turned until a zero mark is aligned with marker 110, after which nut 114 is retightened. Then, to obtain simulated piston functions corresponding to a different piston in the rotating machine, thumb screw 40 is loosened, and housing 32 is rotated until the proper angular indicia on plate 108, representing the angular difference between the two pistons, is aligned with marker 110.

The method and apparatus of the present invention are of particular advantage in that piston functions, which are simulated by the function generator device, are directly applied to the input of an oscilloscope or the like and the oscilloscope pattern is easily correlated with engine operation. In effect, certain oscilloscope inputs are supplied in the form of data not easily ascertained directly from engine transducers, i.e. piston displacement and crank angle, as well as markers corresponding to crank or output shaft position. This data, when presented with data from engine transducers, provides a meaningful and easy-to-understand output portrayal.

While I have shown and described preferred embodiments of my invention, it will be apparent to those skilled in the art that many cahnges and modifications may be made without departing from my invention in its broader aspects. I therefore intend to appended claims to cover all such changes and modifications as fall within the true spirit and scope of my invention.

I claim:

1. A system for portraying a function related to piston position or shaft rotation in a rotating machine comprising:

a rotational function generator device including a function disc carried by a support shaft driven at the same speed as and in direct synchronism with the crankshaft of said machine, said disc being provided with a generally annular light-transmissive area for transmitting light at a location adjacent the axis of said disc as said disc rotates, wherein the transmitted light is descriptive of a simulated piston or rotational function of said machine, a light source proximate said location on one side of said disc for emitting said light, and photosensitive means proximate said location on the opposite side of said disc for receiving said light and delivering an electrical signal in response thereto, rotatable housing means for rotationally indexing the relative position of said disc and said location, said housing means carrying said photosensitive means, said housing means including bearing means rotatable therewith for journaling said support shaft, and an output device for receiving and providing a visual indication in response to the electrical signal from said photosensitive means.

2. The system according to claim 1 wherein said output device comprises a cathode ray oscilloscope for portraying said piston function as a waveform.

3. The system according to claim 1 further including a transducer attached to said machine for simultaneously measuring another function of said machine for application to said output device concurrently with said electrical signal from said photosensitive means to provide a coordinated visual indication therewith.

4. The system according to claim 3 wherein said transducer measures cylinder pressure above the piston, a simulated piston function of which is also being portrayed.

5. The system according to claim 1 wherein said housing means carries said light source and said photosensitive means in juxtaposition on either side of said disc, a frame for said housing means with respect to which said housing means is adjustably rotatable coaxially with said disc, and means restraining axial movement of said housing means.

6. A rotational function generator device for use with a rotating machine comprising:

a function disc adapted for rotation in synchronism with the crank shaft of said machine, said disc being provided with a generally annular recording of contrasting light transmissivity, such recording comprising a pattern defined by an area between two eccentric circles for portraying piston displacement in said machine, a light source adjacent said disc on one side of said recording, and a photosensitive means located adjacent said disc on the opposite side of said recording from said light source to provide an electrical signal in accordance with the light transmitted through said recording.

7. A rotational function generator device for use with a rotating machine comprising:

a function disc adapted for rotation in synchronism with the crank shaft of said machine, said disc being provided with a generally annular first recording of contrasting light transmissivity, such recording comprising a pattern defined by an area between two eccentric circles for portraying piston displacement in said machine, said disc also being provided with a generally annular second recording of contrasting light transmissivity concentrically spaced on said disc from said first recording, said second recording comprising an area of spirally changing width for portraying the crank angle of said rotating machine, a light source adjacent said disc on one side of said recordings, a photosensitive means located adjacent said disc on the opposite side of said first recording from said light source to provide an electrical signal in accordance with the light transmitted through said first recording, and further photosensitive means located adjacent the second recording for providing an electrical output proportioned to the light transmitted by the second recording.

8. The rotational function generator device according to claim 7 further including a stationary mask between said disc and said photosensitive means, said mask having a slot adjacent said second recording extending substantially radially of said disc with a non-uniform width for compensating for nonlinearity in the proportion of light transmitted to said second recording.

9. The rotational function generator according to claim 8 wherein said slot is hour-glass shaped.

10. A rotational function generator device for use with a rotating machine comprising:

a function disc adapted for rotation in synchronism with the crank shaft of said machine, said disc being provided with a generally annular recording of contrasting light transmissivity, such recording comprising a pattern defined by an area between two eccentric circles for portraying piston displacement in said machine, said disc also being provided with regularly spaced angle markers around said disc, a light source adjacent said disc on one said recording and said markers, first photosensitive means located adjacent said disc on the opposite side of said recording from said light source to provide an electrical signal in accordance with the light transmitted through said recording, and second photosensitive means adjacent said disc on the opposite side of said angle markers from said light source for detecting said angle markers.

11. A rotational function generator device for use with a rotating machine comprising:

a function disc adapted for rotation in synchronism with the crank shaft of said machine, said disc being provided with a generally annular recording of contrasting light transmissivity, such recording comprising a pattern defined by an area between two eccentric circles for portraying piston displacement in said machine, a light source adjacent said disc on one side of said recording, a photosensitive means located adjacent said disc on the opposite side of said recording from said light source to provide an electrical signal in accordance with the light transmitted through said recording, and a stationary mask between said disc and said photosensitive means and substantially in line with said light source and said photosensitive means, said mask having a slot extending substantially radially of said disc with a non-uniform width for compensating for nonlinearity in the proportion of light transmitted to said recording.

12. The rotational function generator according to claim 11 wherein said slot is narrowest directly between said light source and said photosensitive means.

13. A rotational function generator device for use with a rotating machine comprising:

a substantially cylindrical housing having a central hub provided with bearing means, a shaft journaled in said bearing means and extending through said hub for connecting to a rotating machine on one side of said hub, a function disc carried by said shaft on the opposite side of said hub, said disc being provided with a generally annular recording of contrasting light transmissivity the width of which represents a simulated piston function of said machine, light source means and photosensitive means supported by said housing on either side of said function disc in substantial alignment with one another, and a frame having a ring shaped opening for rotatably receiving said housing, said frame being rotatable therewithin said frame having a clamp means for selectively securing said housing against rotation.

14. The rotational function generator device according to claim 13 further provided with an indicator plate releasably secured to said housing on the side thereof opposite said function disc.

15. The rotational function generator device according to claim 14 wherein said central hub is threaded at the end thereof opposite said function disc, and further including a threaded nut received thereupon for releasably holding said indicator plate against said housing.

16. The rotational function generator device according to claim 13 wherein said housing includes a peripheral groove, and wherein said frame is provided with key means protruding into said groove for preventing longitudinal movement of said housing.

17. The rotational function generator according to claim 13 wherein said frame is radially split and provided with tightening means for selectively securing said housing against movement.

References Cited

UNITED STATES PATENTS

| | | |
|---|---|---|
| 2,402,989 | 7/1946 | Dickinson. |
| 2,445,046 | 7/1948 | Tinkham _____ 73—115 |
| 3,164,011 | 1/1965 | Casillas _____ 73—116 |

JERRY W. MYRACLE, Primary Examiner

U.S. Cl. X.R.

250—233

PO-1050
(5/69)

UNITED STATES PATENT OFFICE
CERTIFICATE OF CORRECTION

Patent No. 3,495,451   Dated Feb. 17, 1970

Inventor(s) WILLEM H. VERHOEF

It is certified that error appears in the above-identified patent and that said Letters Patent are hereby corrected as shown below:

Column 1, line 14, "recording" should be --recordings--.
Column 2, line 31, "take" should be --taken--; line 63, "vetrical" should be --vertical--; line 70, "vetrical" should be --vertical--.
Column 3, line 45, after "coupling 56", change "to" to --at--.
Column 4, line 19, change "func-" to --function--.
Column 7, line 23, "cahnges" should be --changes--.
Column 10, line 1, insert a comma --,-- after "therewithin".

SIGNED AND
SEALED
SEP 15 1970

(SEAL)
Attest:

Edward M. Fletcher, Jr.
Attesting Officer

WILLIAM E. SCHUYLER, JR.
Commissioner of Patents